Patented Dec. 3, 1935

2,022,748

UNITED STATES PATENT OFFICE 2,022,748

VAT DYESTUFF PRINTING PASTE

Philip H. Stott, Penns Grove, N. J., and Earl Edson Beard, South Milwaukee, Wis., assignors to E. I. du Pont de Nemours & Company, Wilmington, Del., a corporation of Delaware No Drawing. Application March 8, 1933, Serial No. 660,076

8 Claims. (Cl. 8—6)

This invention relates to vat dyestuff printing pastes for textile fabric. It is an object of this invention to improve the qualities of printing pastes prepared from vat dyestuffs, particularly as concerns the tinctorial strength, and ageing characteristics of the paste, and brightness of the print. Other and further important objects of this invention will appear as the description proceeds.

We have found that vat dyestuffs which are normally but poorly adapted for printing in view of the weak prints they produce may have their tinctorial strength considerably increased by incorporating into the printing paste a vat dyestuff of substantially similar color but possessing relatively increased solubility in the vat. The latter will hereinafter be referred to as the assistant vat dyestuff. By relatively increased solubility, we are referring to the solubility of the assistant vat dyestuff as compared to the solubility of the principal vat dyestuff itself which is used to produce the desired color. By the vat, we are referring to the standard alkaline hydrosulfite vat used for reducing and dissolving vat dyestuffs. Although the vat itself is not used in printing processes, the solubility of a given vat dyestuff therein constitutes, according to our discovery, a test for the capacity of this compound to act as an assistant in a vat dyestuff printing paste.

The above effect may be illustrated by considering the dyestuff, 1,5-dibenzoyl-diamino-anthraquinone. This compound, when used by itself in the usual printing pastes, produces very weak yellow prints. If, however, admixed with 1,8-dibenzoyl-diamino-anthraquinone, which possesses substantially the same color as the 1,5-isomer, but is considerably more soluble in the vat, the resulting prints possess increased strength, brilliance, and improved ageing qualities. The remarkable point is that 1,8-dibenzoyl-diamino-anthraquinone itself constitutes but a very poor printing color. The mixture thus produces effects which could not be predicted from the properties of its individual components.

For best results, the assistant should be in finely divided form. This form can best be obtained by dissolving the assistant in concentrated sulfuric acid, drowning the solution in water, filtering and washing. The resulting paste may be mixed with the aqueous paste of the principal dyestuff, or it may be incorporated into the thickening-and-reducing paste either prior to or after the introduction of the main dyestuff paste.

The proportion of the assistant to principal dyestuff may vary within wide limits. It may be as low as 1:10 or as high as 1:1 by weight, or even higher. The beneficial effect generally increases with increased proportions. As already noted, this beneficial effect may be observed on the tinctorial strength of the principal dyestuff, the brightness of the resulting print, and the ageing qualities. The ageing period required for bringing out the full effect of the color is generally considerably shortened.

The above effects are particularly useful in the case of the yellow to orange dyestuffs of the algol series, since a good printing yellow of the vat dyestuff series has been wanting for some time. The assistants for colors of this type are acylamino-anthraquinones. In the following table is shown a number of dyestuffs and combinations of the yellow to orange series which have been considerably improved by the addition of an assistant of the acylamino-anthraquinone type.

| | Color | Parts | Assistant | Parts |
|---|---|---|---|---|
| 1. | Dibenzoyl-1,5-diamino-anthraquinone | 90 | Dibenzoyl-1,8-diamino-anthraquinone | 10 |
| 2. | Do. 1 | 80 | ....do. 1 | 20 |
| 3. | Do. 1 | 70 | ....do. 1 | 30 |
| 4. | 1-benzoylamino-5-(1,9-anthraisothiazole-2-carbonyl)-amino-anthraquinone | 80 | ....do. 1 | 20 |
| 5. | Benzoyl-β-naphthoyl-1,5-diamino-anthraquinone | 70 | ....do. 1 | 30 |
| 6. | Do. 1 | 60 | ....do. 1 <br> 1-benzoylamino-anthraquinone | 30 <br> 10 |
| 7. | Do. 1 <br> Pyranthrone <br> Diphenyl-2,1,6,5-anthraquinone-dithiazole | 30 <br> 10 <br> 30 | ....do. 1 | 30 |
| 8. | Do. 4 <br> Pyranthrone <br> Diphenyl-2,1,6,5-anthraquinone-dithiazole | 30 <br> 10 <br> 30 | ....do. 1 | 30 |
| 9. | Do. 5 <br> Pyranthrone <br> Diphenyl-2,1,6,5-anthraquinone-dithiazole | 30 <br> 10 <br> 30 | ....do. 1 | 30 |
| 10. | Diphenyl-2,1,7,8-anthraquinone-dithiazole <br> Pyranthrone <br> Diphenyl-2,1,6,5-anthraquinone-dithiazole | 30 <br> 10 <br> 30 | ....do. 1 | 30 |
| 11. | Dianisyl-1,5-diamino-anthraquinone <br> Pyranthrone <br> Diphenyl-2,1,6,5-anthraquinone-dithiazole | 30 <br> 10 <br> 30 | ....do. 1 | 30 |
| 12. | Do. 11 | 30 <br> 10 <br> 30 | Dianisyl-1,8-diamino-anthraquinone | 30 |

Instead of the particular assistants mentioned above, any other acylamino-anthraquinone may be used whose solubility in the vat is greater than that of the principal dyestuff employed. Examples of such additional assistants are:

α- or β-acetylamino-anthraquinone; α- or β-benzoyl-amino-anthraquinone; 1,4-dibenzoyl-diamino anthraquinone; 1-benzoyl-amino-4- or 8-halogen-anthraquinone; 1-benzoylamino-4- or 8-amino-anthraquinone; 1-benzoylamino-4- or 8-hydroxy-anthraquinone; alkyl ethers of the latter; 1-benzoylamino-anthraquinone-6-carboxylic acid; hydroxy-benzoylamino-anthraquinone; the imide of 1,9-anthrathiazol-2-carboxylic acid and α- or β-amino-anthraquinone; the imide of a 1-aroylamido-anthraquinone-6-carboxylic acid and α- or β-amino-anthraquinone; the di-imide obtained from two moles of a 1-aroylamido-anthraquinone-6-carboxylic acid and one mole of 1,8-diamino-anthraquinone (the latter is particularly advantageous where the corresponding 1,5-di-imide is used as the principal dyestuff); the di-imide from two moles of anthraquinone-2-carboxylic acid and 1,8-diamino-anthraquinone; the imide of anthraquinone-2-carboxylic acid and α- or β-amino-anthraquinone; and many others.

Without limiting the invention the following examples are given to illustrate the process of preparing and using our improved printing pastes.

*Example 1. Preparation of dyestuff paste containing both the principal color and the assistant*

1 part of crude dibenzoyl-1,8-diamino-anthraquinone in powder form is suspended in 12 parts of 95% sulfuric acid, maintained at 5° C., and stirred until completely dissolved. The solution is then poured into 250 parts of ice water, filtered and washed acid-free. The filter cake is suspended in 40 parts of water, the mass is warmed up to 80-85° C., and 5 to 10 parts of a 10% alkaline hypochlorite solution are added, and the mass is maintained at this temperature for 2-4 hours. It is then filtered and washed free of alkali. Water is then added to temper the paste to the desired consistency, which is usually made to correspond to about 15 to 20% of solid material by weight. 0.15 parts of a 30% leucanol solution, or a suitable quantity of any other wetting agent is then added, and the paste is milled to the desired degree of fineness.

2 parts of dibenzoyl-1,5-diamino-anthraquinone are made into a paste by substantially the same procedure as above, using correspondingly increased proportions of the various materials. The two pastes are mixed together and subjected to joint milling until thoroughly uniform.

*Example 2*

2 parts of dibenzoyl-1,5-diamino-anthraquinone and 1 part of dibenzoyl-1,8-diamino-anthraquinone, both in powder form, are jointly suspended in 36 parts of 95% sulfuric acid, and stirred at 5° C. until completely dissolved. The rest of the procedure is then substantially like in Example 1, except that correspondingly increased proportions of the various materials are used throughout. In this process the intermixing of the principal dyestuff and assistant occurs during the step of dissolving in sulfuric acid, and the result is a very uniform paste excellently adapted for printing purposes.

*Example 3. Preparation of the printing paste and process of printing*

A thickening-and-reducing paste is prepared as follows:

| | Parts |
|---|---|
| Wheat starch (dry) | 55 |
| British gum | 165 |
| 6% gum tragacanth solution | 55 |
| Water | 275 |
| Potassium carbonate | 190 |
| Sodium formaldehyde sulfoxylate | 160 |
| Glycerine | 100 |
| Total | 1000 |

A printing paste is now prepared by mixing together thoroughly 80 parts of the above thickening-and-reducing paste and 20 parts of the dyestuff paste prepared according to either of Examples 1 and 2. Cotton fabric or cloth is then printed with this paste in the usual manner, and dried. It is then steamed in a rapid ager for 2 to 8 minutes, at a temperature of 101-102° C. The print is then oxidized in a dilute sodium-bichromate solution or in cold running water, after which it is soaped, rinsed and dried.

The print so prepared by the use of a mixture of dibenzoyl-1,5-diamino-anthraquinone and dibenzoyl-1,8-diaminoanthraquinone is considerably stronger and brighter, after 8 minutes ageing, than prints prepared by the use of either component alone under similar conditions.

It will be understood that the use of our novel assistants as above illustrated does not exclude the use of other printing assistants or dispersing agents. On the contrary, it is advantageous to use such additional assistants and dispersing agents as are known to the art, for instance, the various iso-propyl-naphthalene sulfonic acids, the various sulfonic acids of the abietene family; diethylene glycol; polyhydroxyl-alkyl-amines, and the like.

In general, it should be understood that numerous variations and modifications may be introduced in our preferred procedure above set forth, without departing from the spirit of this invention.

We claim:

1. The process of improving the printing qualities of a vat dyestuff of the algol series, which comprises incorporating into the printing paste containing the same an acylamino-anthraquinone characterized by high solubility in the alkaline hydrosulfite vat.

2. The process of improving the printing qualities of a 1,5-diaroyl-diamino-anthraquinone, which comprises incorporating into a printing paste containing said compound a 1,8-diaroyl-diamino-anthraquinone.

3. A printing paste comprising as principal color a yellow to orange vat dyestuff of the anthraquinone series, and as assistant an acylamino-anthraquinone having a greater solubility in the alkaline hydrosulfite vat than the anthraquinone dyestuff with which it is used.

4. A printing paste comprising as principal color a vat dyestuff of the algol series, and as assistant an acylamino-anthraquinone characterized by high solubility in the alkaline hydrosulfite vat.

5. A printing paste comprising a 1,5-diaroyl-diamino-anthraquinone as principal color, and a 1,8-diaroyl-diamino-anthraquinone as assistant, the ratio of the latter to the former being between 1/10 and 1.

6. A printing paste comprising substantially 30 parts of dibenzoyl-1,5-diamino-anthraquinone, 30 parts of dibenzoyl-1,8-diamino-anthraquinone, 10 parts of pyranthrone, and 30 parts of diphenyl-2,1,6,5-anthraquinone-dithiazole.

7. A printing paste comprising substantially 30 parts of 1-benzoylamino-5-(1,9-anthraisothiazole-2-carbonyl)-amino-anthraquinone, 30 parts of dibenzoyl-1,8-diamino-anthraquinone, 10 parts of pyranthrone and 30 parts of diphenyl-2,1,6,5-anthraquinone-dithiazole.

8. A printing paste comprising substantially 30 parts of diphenyl-2,1,7,8-anthraquinone-dithiazole, 30 parts of dibenzoyl-1,8-diamino-anthraquinone, 10 parts of pyranthrone and 30 parts of diphenyl-2,1,6,5-anthraquinone-dithiazole.

PHILIP H. STOTT.
EARL EDSON BEARD.